J. RADA.
HOG CHUTE.
APPLICATION FILED MAY 9, 1910.

1,036,147.

Patented Aug. 20, 1912.
2 SHEETS—SHEET 1.

Jacob Rada
Inventor,

Witnesses by

Attorneys.

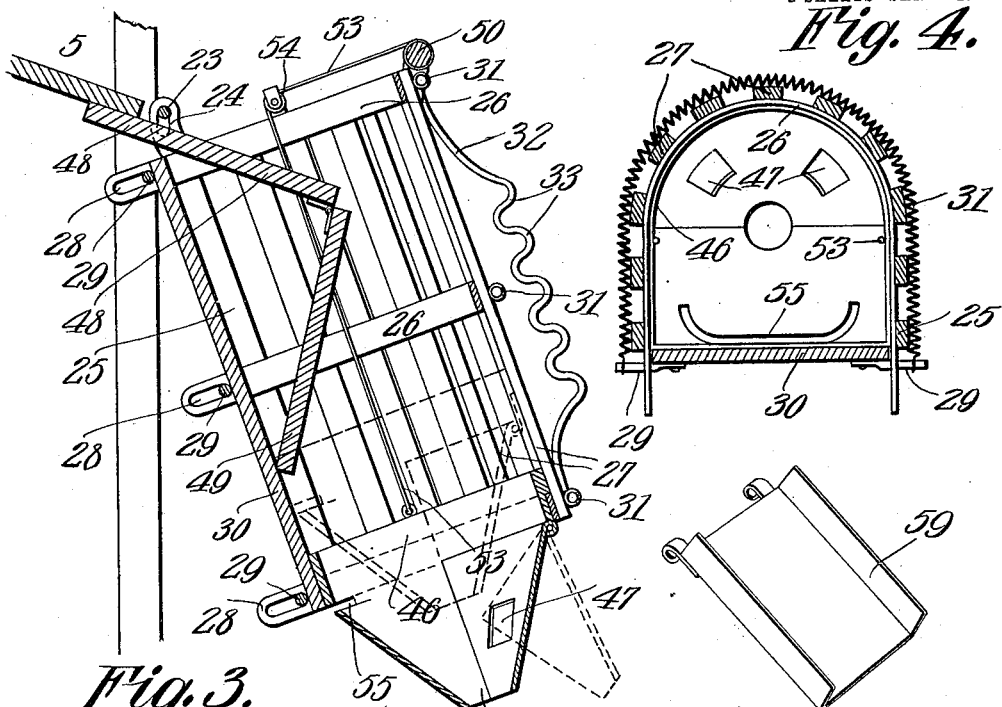
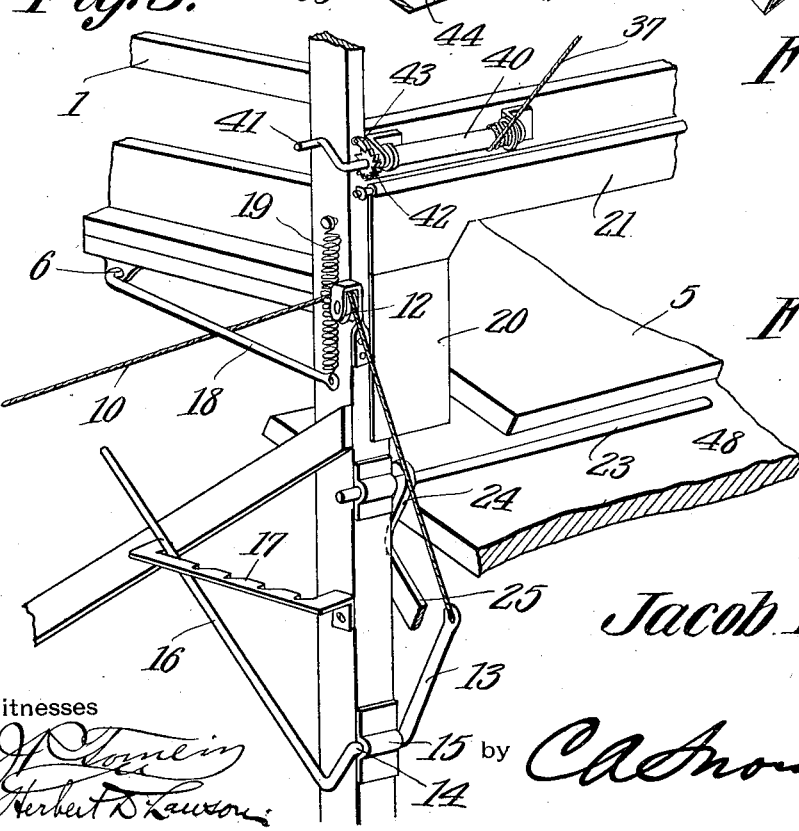

UNITED STATES PATENT OFFICE.

JACOB RADA, OF JENNINGS, KANSAS.

HOG-CHUTE.

1,036,147.   Specification of Letters Patent.   Patented Aug. 20, 1912.

Application filed May 9, 1910. Serial No. 560,116.

*To all whom it may concern:*

Be it known that I, JACOB RADA, a citizen of the United States, residing at Jennings, in the county of Decatur and State of Kansas, have invented a new and useful Hog-Chute, of which the following is a specification.

This invention relates to hog chutes or stanchions and is more particularly an improvement upon the structure disclosed in Patent No. 944,379, issued to me on December 28, 1909.

One of the objects of the invention is to provide a novel form of adjustable holder arranged to receive animals discharged from a platform, this holder being employed in scalding or dipping the hogs or in ringing or marking them.

With these and other objects in view the invention consists of certain novel details of construction and combinations of parts hereinafter more fully described and pointed out in the claims.

In the accompanying drawings the preferred form of the invention has been shown.

Figure 1:
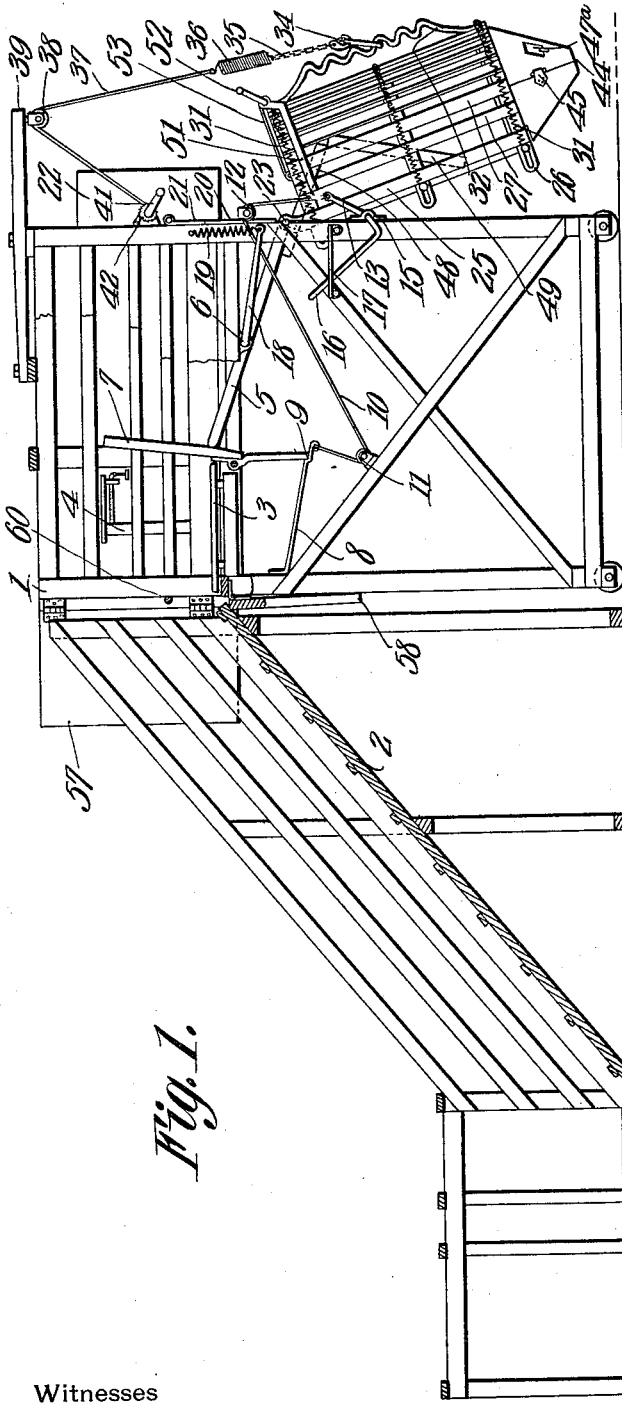
Figure 2:
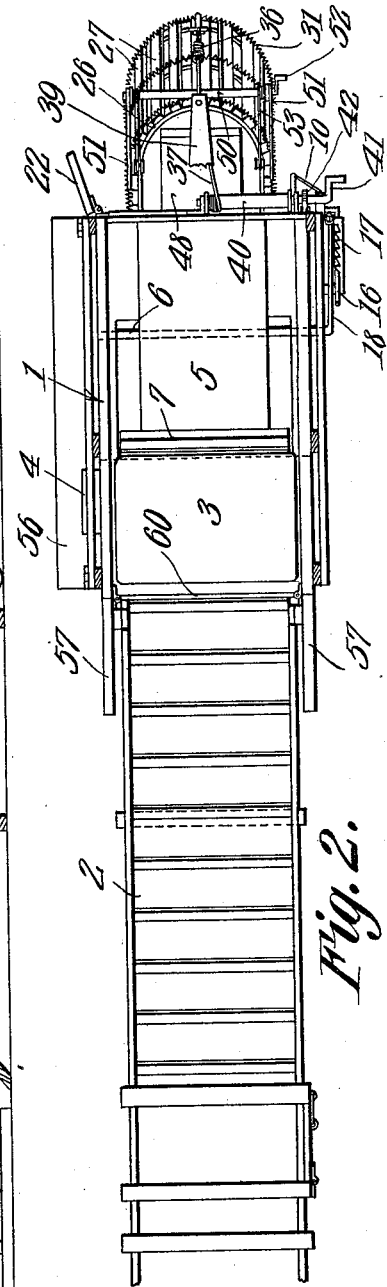

In said drawings:—Figure 1 is a side elevation partly in section of a chute or stanchion constructed in accordance with the present invention, the holder being shown in its lowermost position, the tiltable platform being shown out of its normal position and the gate being shown locked in raised position. Fig. 2 is a plan view of the complete structure. Fig. 3 is an enlarged longitudinal section through the holder and adjacent parts, one of the arcuate members of the discharge end of the holder being shown, by dotted lines, in open position and said discharge portion being shown, by dotted lines, retracted into the holder. Fig. 4 is a transverse section through the holder and showing the discharge end portion in elevation. Fig. 5 is a perspective view of a portion of the discharge end of the chute. Fig. 6 is a perspective view of an attachment adapted to be used in lieu of the holder shown in Figs. 1 to 4 inclusive.

Referring to the figures by characters of reference 1 designates a runway arranged at the upper end of an incline 2 and that portion 3 of the floor of the runway adjacent the upper end of the incline 2, constitutes the platform of scales 4. It will be apparent, therefore, that as soon as an animal leaves the incline 2 and enters the runway 1 its weight is received by the platform 3 and can be readily determined by the scales 4. These scales may be of any suitable construction and are preferably of that type adapted to automatically register and record the weights of the animals passing over the platform.

Arranged between the platform 3 and the outlet end of the runway, is a tiltable platform 5 mounted to swing about a horizontal rod 6 mounted within the sides of the runway and engaging an intermediate portion of the platform 5. A swinging gate 7 extends between the sides of the runway and is pivotally connected to the bottom portion of the sides of said runway, and is located between the adjacent ends of the platforms 3 and 5, this gate being designed to normally lie substantially horizontally and thus lap and bear downwardly upon the platform 5 and to extend under and bear upwardly against the structure supporting the platform 3. The parts are so positioned that after an animal has passed over the lowered gate 7 and places its weight upon the exposed end portion of the platform 5, said platform will be swung downwardly at its discharge end, the opposite end thereof being thus elevated and pushing upwardly against the gate 7 so as to swing it up into closed position as indicated in Fig. 1. It will thus be apparent that it becomes impossible for a second animal to leave the platform 3 and move onto the tilting platform 5 until the gate 7 has been lowered.

In order that the gate may be automatically locked in closed position, a spring catch 8 is arranged below the runway and the lower end of the gate is adapted to ride thereon and to engage a shoulder 9 formed upon the catch. In order to release the gate and permit it to move to open position, a cord 10 or the like is connected to the free end of the catch and passes under a guide sheave 11 and thence over a second guide sheave 12, the cord being attached at one end to an arm 13 formed at one end of a rod 14 which is adapted to rotate within a suitable bearing 15 provided therefor. A lever 16 extends from this rod and constitutes a handle whereby the rod may be rotated so as to swing the arm 13 and pull upon the cord 10. A rack 17 may be arranged adjacent the lever 16 and constitutes means for locking said lever in any position to which it may be adjusted.

An arm 18 extends from the pivot rod 6 and toward the outlet end of the chute, the free end of this arm being connected to a spring 19 which is attached to the chute structure and serves to hold the arm 18 normally elevated. It is to be understood that when the platform 5 is tilted, the arm 18 swings therewith and places the spring 19 under stress. Obviously, therefore, as soon as the platform 5 is relieved of the weight of an animal, the said spring will return it to its normal position.

Side strips 20 are secured to the outlet end of the runway and with their lower ends substantially in the plane occupied by the lower end of the tilting platform 5 when said platform is in its inclined position. A top strip 21 is hingedly connected to the discharge end of the chute and coöperates with the side strips 20 to form a slightly reduced outlet opening, it being understood that the top strip 21 is capable of swinging outwardly and upwardly when subjected to the pressure of an animal thereagainst. A guard door 22 is hingedly connected to one side of the outlet end of the chute and is adapted to prevent the animals from escaping at one side of said chute when the said chute is being employed for the purpose of loading animals into wagons.

A pivot rod 23 is removably mounted within the structure at a point adjacent the lower end of the tilted platform 5 and this rod is pivotally engaged by the slotted ends 24 of bottom side strips 25 constituting parts of the holder used in connection with the chute. These side strips are secured to the end portions of substantially U-shaped resilient strips 26 on which longitudinal slats 27 are secured. The end portions of these resilient strips are slotted longitudinally as shown at 28 and these slots receive trunnions 29 extending from the sides of a bottom board 30. Coiled springs 31 are secured at their ends to these trunnions and extend partly around the holder and along lines parallel with the strips 26. Obviously these springs thus serve to hold the trunnions 29 normally pressed against the upper or inner end of the slot 28. A rod 32 is secured at its ends to the ends of the holder at points midway between the side strips 25 and this rod is bent to form a plurality of loops or projections 33 any one of which is adapted to be engaged by a ring 34. This ring is detachably connected to a rope, chain, or other flexible device such as indicated at 35 and this device is in turn attached to a spring 36. The said spring is connected to another flexible device 37 which extends over a guide sheave 38 mounted upon an arm 39 extending from the top of the outlet end of the chute. The connection 37 extends downwardly from this sheave to a windlass 40 mounted upon the front or outlet portion of the chute. This windlass may be actuated in any suitable manner, as by means of a crank 41 and a ratchet wheel 42 rotates with the windlass and is normally engaged by a spring actuated pawl 43. It will be apparent that by winding the connection 37 upon the windlass the holder can be swung in a vertical plane about the pivot rod 23 and thus be held at any desired angle relative to the horizontal.

The lower or discharge end of the holder is closed by upper and lower arcuate members 44 which are adapted to be secured together at their meeting edges, in any suitable manner, as by means of catches 45. These sections are so shaped that, when they are closed together, they form a substantially frusto-conical spout. The lower section is fixedly connected to a frame 46 slidable in the holder and the upper section is hingedly connected to the frame 46, one of the sections having openings 47 therein which are adapted to be closed by means of doors 47a. An inclined board 48 extends from the outlet end of the chute and into the upper end of the holder, this board being arranged at the angle assumed by the platform 5 when it is tilted and the said board also constituting means for limiting the tilting movement of the platform. A second board 49 is hinged to the lower end of the board 48 and is adapted to bear at its free end upon the bottom board 30 of the holder. A rod or windlass 50 is mounted in brackets 51 on the inlet end of the holder and has a crank 52 or the like for operating it. Cables 53 are secured to this rod and pass over guide sheaves 54 and thence to the frame 46 to which they are secured. It will thus be seen that by winding the cable on the rod the frame 46 and the conical spout can be shifted longitudinally of the holder to properly engage hogs of different sizes. A slot 55 is formed in the bottom section of the spout so as to permit the insertion of a knife to cut the throat of the supported hog. If desired hinged shelves can be attached to either or both sides of the runway for use in holding means when butchering. One of the shelves has been shown at 56.

In using the chute and holder for the purpose of marking or ringing hogs, the holder is swung about its pivot rod 23 until the bottom board 30 is brought into position parallel with the board 48. When the parts are thus located the board 49 will of course rest flat upon the bottom 30. The two spout sections 44 are secured together and the hogs are then driven up the incline 2 and into the runway 1. This runway is only wide enough for one animal to pass therethrough at a time and as soon as the weight of the front legs is applied to the platform 5 at points beyond the pivot 6, said platform will be tilted downwardly toward the holder and the upwardly moving end of the platform will swing the door 7 to closed position, the lower end of said door moving into engagement with the shoulder 9 of the catch 8. As soon as the platform is tilted the animal will slide therealong and into the holder, the head of the animal assuming a position within the spout 44 and the said holder adjusting itself automatically to the animal so as to bind yieldingly upon it. While the animal is thus located in the holder the snout will project through the opening in the spout and access may be had to the ears by opening the doors 47ª. By unfastening the spout sections 44, they will be permitted to swing apart and thus allow the animal to pass entirely through the holder. As soon as the animal leaves the tilting platform 5, the same will return to its normal position but the door 7 will be held closed by the catch 8 until the lever 16 is shifted so as to pull on the cord 10 and deflect the catch. The door will then swing down to its open position and the device is ready for the repetition of the foregoing operation.

When it is desired to scald or dip the hogs, the holder can be swung downwardly with the animal therein and into the position shown in Fig. 1. The actuation of the holder is of course effected by means of the windlass. When it is desired to load a wagon, the holder can be detached by removing the rod 23 and the boards 48 and 49 can be adjusted so as to direct the animals into the wagon as they leave the tilting platform 5. While the chute is being used for loading a wagon, the door 22 will prevent the animals from escaping between the chute and the wagon at that side of the chute remote from the operator who, necessarily, is located adjacent the lever 16 and the crank 41. As the animals pass through the runway they will successively depress the platform 3 of the scales and the weight thereof will therefore be accurately indicated.

If desired, the runway 1 may be moved a short distance away from the incline 2 and side doors 57 which are hinged to the walls of the runway adjacent to the incline can be swung so as to close the spaces between the runway and the incline when the incline is shifted away from the runway. A hinged floor section 58 which is connected to the runway can be used to close the space between the incline and runway. When dipping hogs, a chute such as shown at 59, in Fig. 7, may be substituted for the holder shown in Fig. 4, it merely being necessary to withdraw the pivot rod 23 from the slotted ends 24 and to then reinsert the said rod through eyes formed at the upper end of the chute 59. A retaining rod 60 may be extended transversely of the runway at the inlet end thereof, so as to prevent animals from backing out of the runway and on to the incline after they have assumed positions upon the platform of the scales.

Various changes can of course be made in the construction and arrangement of the parts without departing from the spirit or sacrificing any of the advantages of the invention as defined in the appended claims.

What is claimed is:—

1. A device of the class described including a runway, a tiltable platform, an elastic holder movably supported in position to receive animals discharged from the tilting platform, a head receiving spout upon said holder, and means for adjusting the spout longitudinally within the holder.

2. A device of the class described including a runway, a tiltable platform therein, a holder movably mounted adjacent the runway to receive animals discharged from the tilting platform, means for swinging said holder, and a sectional head receiving spout extending from one end of and slidably mounted in the holder.

3. A device of the class described including a runway, a tiltable platform, a holder mounted for swinging movement and arranged to receive animals from the tilted platform, said holder including an arched body portion, a yieldingly supported bottom, a head receiving spout, and means for shifting the spout longitudinally within the body portion.

4. A device of the class described including a runway, a tiltable platform, a holder mounted for swinging movement and adapted to receive animals from the tilted platform, said holder including a flexible body, a yieldingly supported bottom, oppositely disposed hingedly mounted spout sections connected to the body, means for adjustably supporting the holder, and inclined hingedly connected boards extending from the runway and into the holder.

5. In a device of the class described a hingedly supported holder including a flexible body, said body including bowed spring strips and connections between the strips, said strips being slotted longitudinally, a bottom having projections slidable within the slots, elastic connections between the projections and extending partly around the body, and a sectional head receiving spout connected to one end of the body.

In testimony that I claim the foregoing as my own, I have hereto affixed my signature in the presence of two witnesses.

JACOB RADA.

Witnesses:
G. W. SHOOK,
S. J. SHOOK.

Copies of this patent may be obtained for five cents each, by addressing the "Commissioner of Patents, Washington, D. C."